(No Model.) 6 Sheets—Sheet 1.
R. W. JORRES.
MACHINE FOR MAKING SHEET METAL CHAINS.
No. 515,961. Patented Mar. 6, 1894.
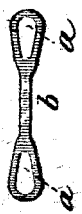
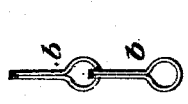
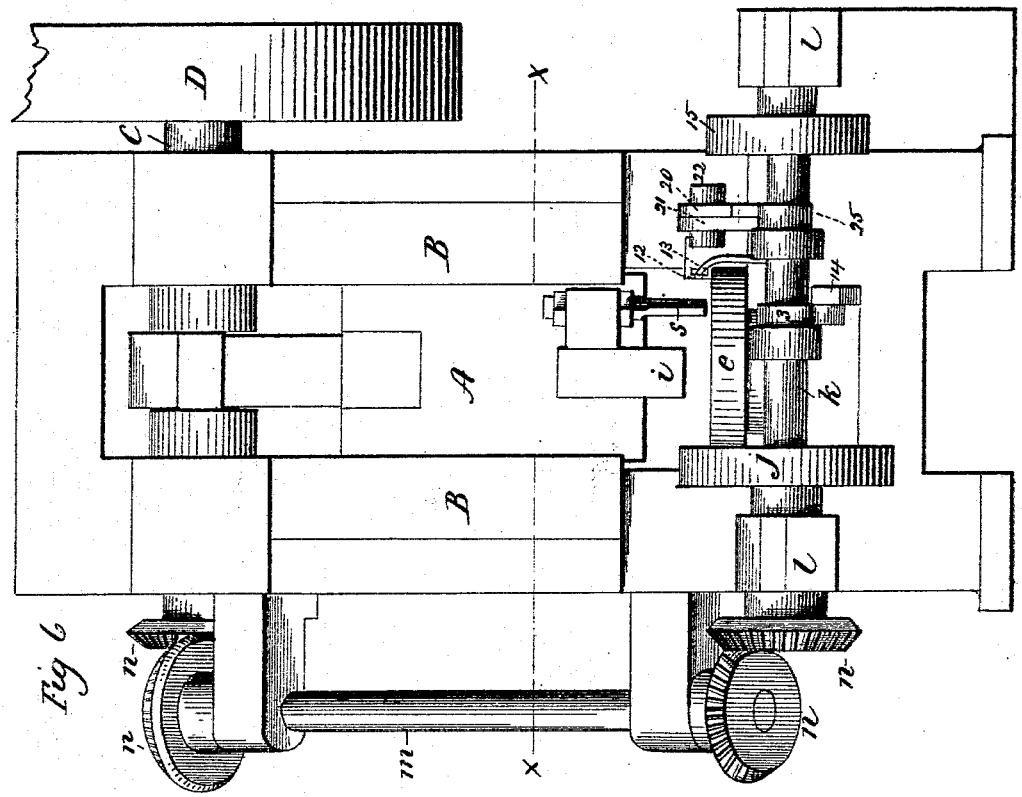

(No Model.) 6 Sheets—Sheet 2.
R. W. JORRES.
MACHINE FOR MAKING SHEET METAL CHAINS.
No. 515,961. Patented Mar. 6, 1894.
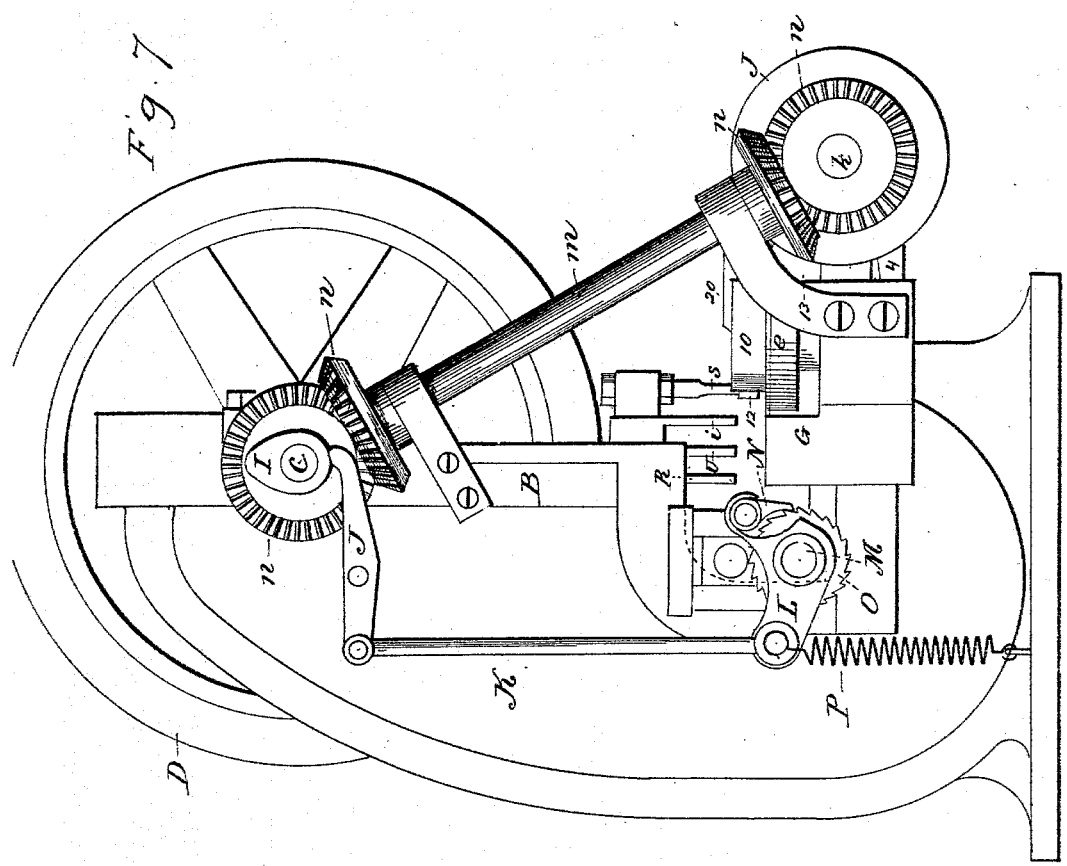

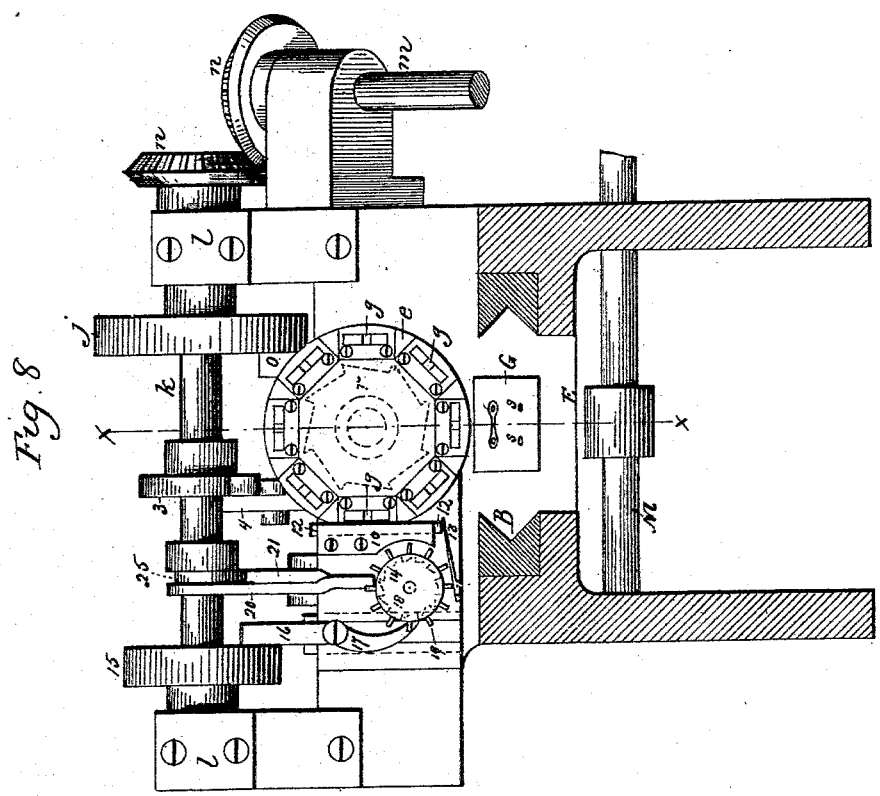

(No Model.) 6 Sheets—Sheet 4.
R. W. JORRES.
MACHINE FOR MAKING SHEET METAL CHAINS.
No. 515,961. Patented Mar. 6, 1894.
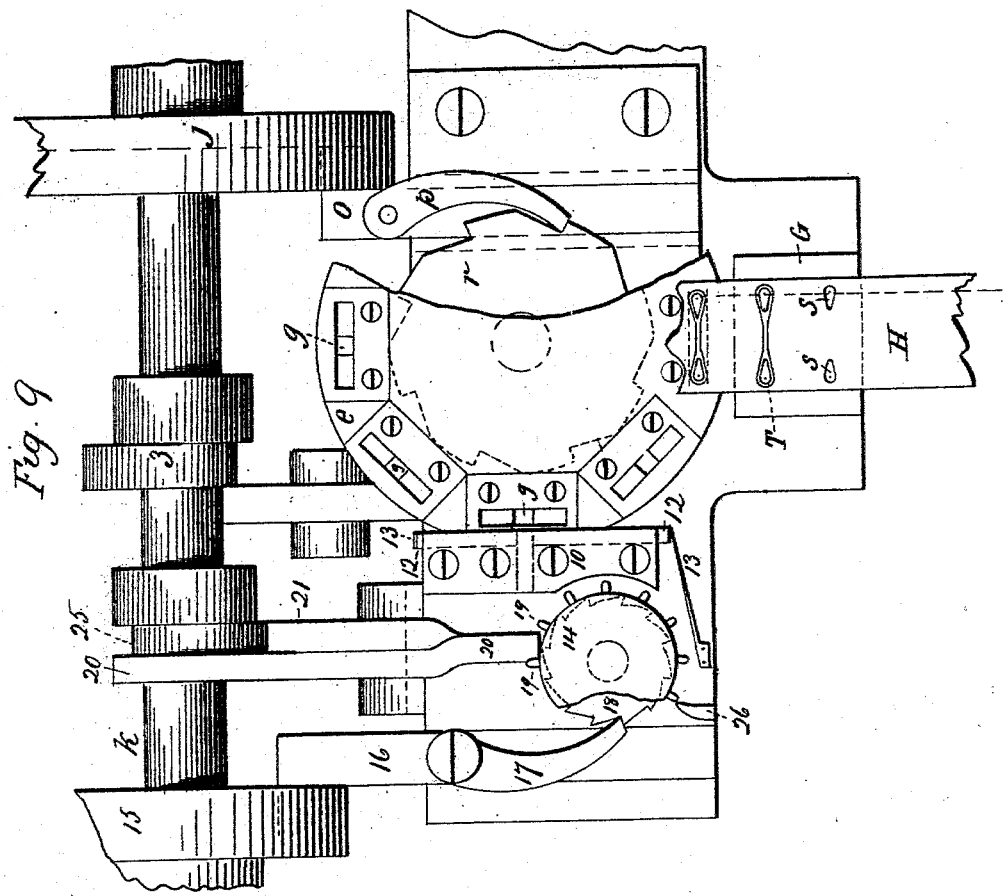
Witnesses
J. H. Shumway
Lillian D. Kelsey
Ralph W. Jorres
Inventor
By attys
Earle Seymour

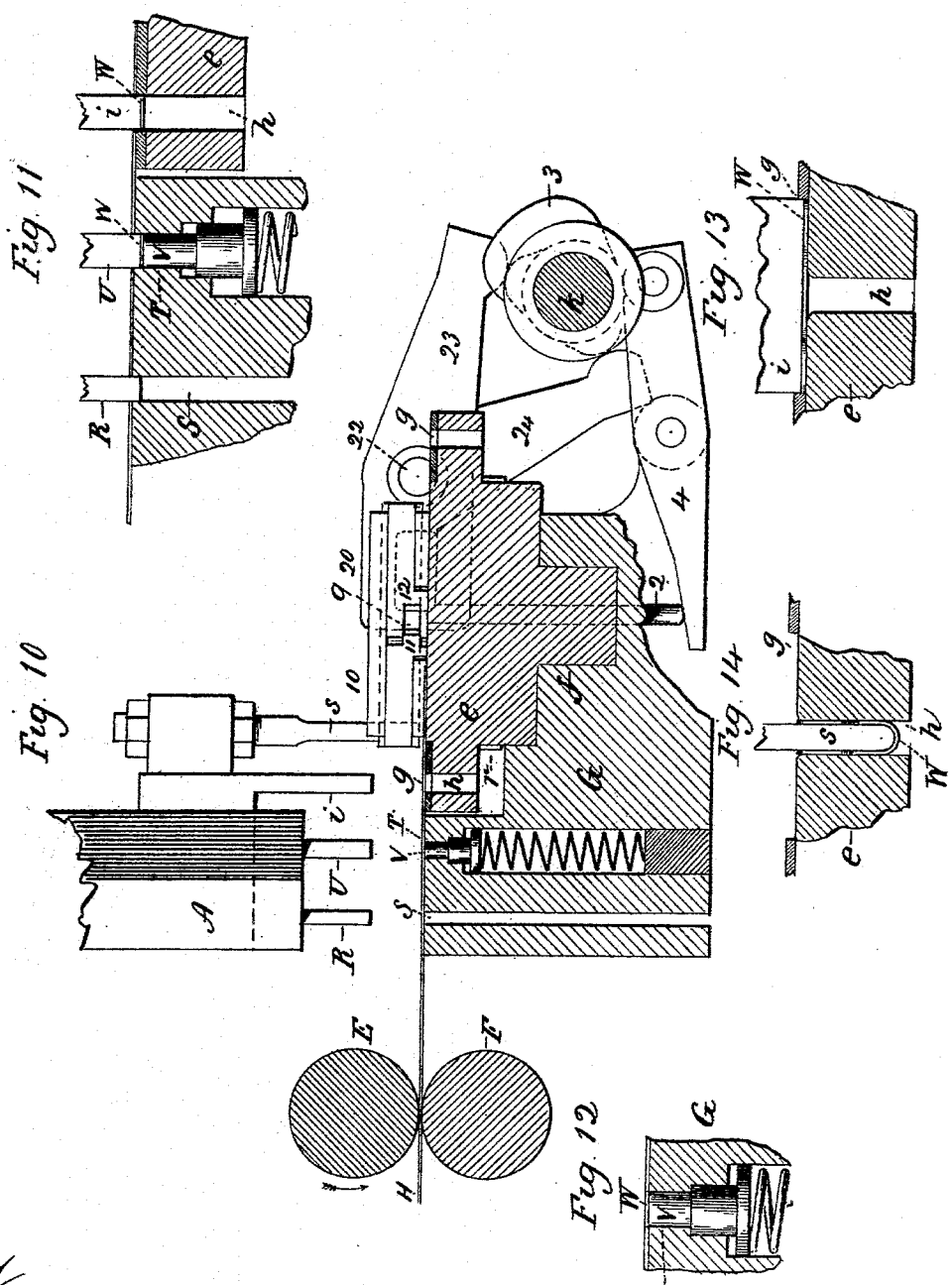

(No Model.) 6 Sheets—Sheet 6.
R. W. JORRES.
MACHINE FOR MAKING SHEET METAL CHAINS.
No. 515,961. Patented Mar. 6, 1894.
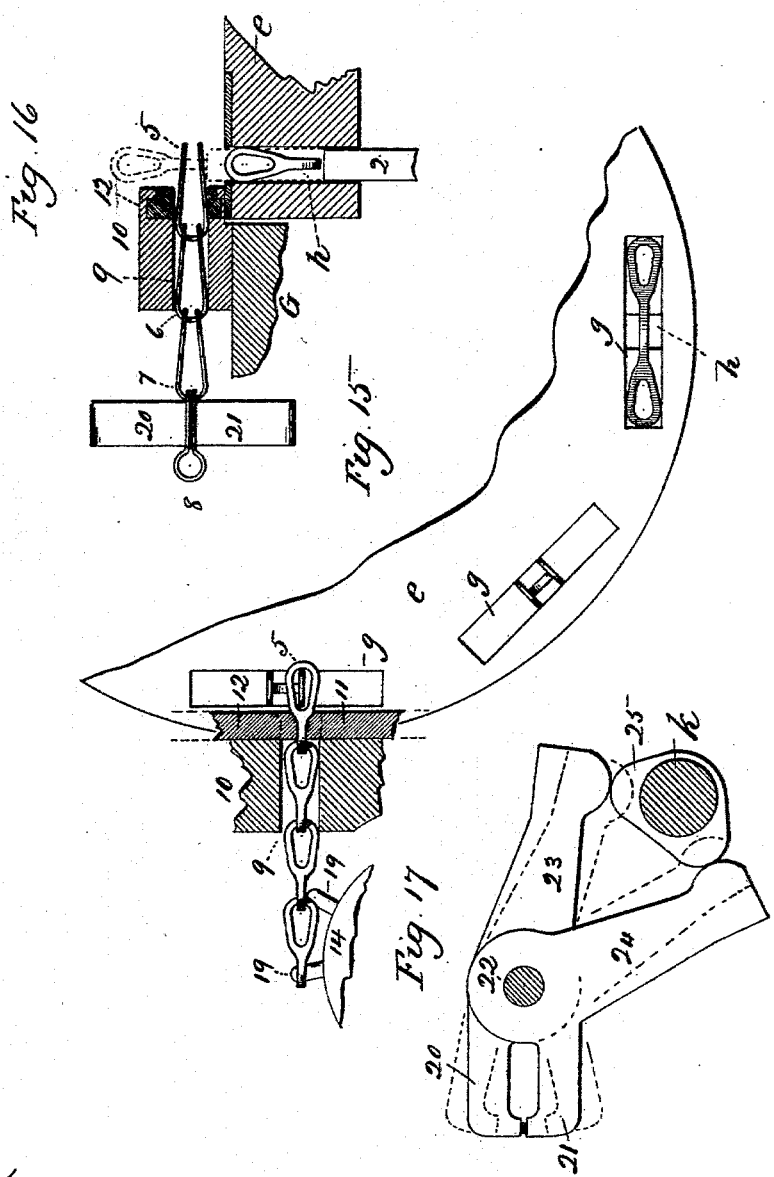

UNITED STATES PATENT OFFICE.

RALPH WM. JORRES, OF WATERBURY, ASSIGNOR TO THE BRIDGEPORT CHAIN COMPANY, OF BRIDGEPORT, CONNECTICUT.

MACHINE FOR MAKING SHEET-METAL CHAINS.

SPECIFICATION forming part of Letters Patent No. 515,961, dated March 6, 1894.

Application filed November 21, 1892. Renewed February 1, 1894. Serial No. 498,803. (No model.)

*To all whom it may concern:*

Be it known that I, RALPH WM. JORRES, of Waterbury, in the county of New Haven and State of Connecticut, have invented a new Improvement in Machines for Making Sheet-Metal Chains; and I do hereby declare the following, when taken in connection with accompanying drawings and the letters and numerals of reference marked thereon, to be a full, clear, and exact description of the same, and which said drawings constitute part of this specification, and represent, in—

Figure 1, a face view of a link blank; Fig. 2, an edge view of two links united; Fig. 3, the blank as bent to U-shape; Fig. 4, an edge view illustrating the method of threading the blanks; Fig. 5, an edge view of two links with the last link drawn into line therewith; Fig. 6, a front view of the machine; Fig. 7, a side view of the machine; Fig. 8, a plan view of the machine cutting through the frame in transverse section on line $x$—$x$ of Fig. 6, the slide removed; Fig. 9, a partial plan view, enlarged, showing parts broken away for convenience of illustration; Fig. 10, a vertical central section cutting on line $x$—$x$ of Fig. 8, enlarged, showing the parts in the normal position; Fig. 11, a partial section cutting on the same plane as Fig. 10, showing the punches as in the down position; Fig. 12, a section showing the follower as having returned the blank W, into the strip; Fig. 13, a vertical section through the table or carrier, cutting centrally through one of the blank-receiving cavities and the bending opening, showing the blank in the cavities; Fig. 14, the same as Fig. 13, illustrating the bending punch as having forced the blank into the opening $h$, in the carrier to bend the blank into U-shape; Fig. 15, a plan view of a portion of the table enlarged, with the head 10 and the jaws 11 and 12 in horizontal section, together with the carrier illustrating the method of feeding the chain as successive links are introduced; Fig. 16, a vertical section cutting on line $x$—$x$ of Fig. 15, and representing face views of the closing jaws 20 and 21; Fig. 17, a side view of the closing jaws.

This invention relates to an improvement in the manufacture of that class of chain in which the links are made from sheet-metal, the blanks for the links having an eye at each end, and the central portion contracted to a width somewhat less than the width of the eyes at the ends, and the blanks bent at their center, so as to bring the two eyes together to form one end of the link, while the central bend forms the other, successive links being passed through the two eyes of each preceding link, a common and well known class of chain.

In Fig. 1, a blank is represented, of the usual shape of blanks for this class of chain; at each end an eye $a$, is formed, the central portion $b$, being narrower than the width of the eyes; the links are doubled at the center, so as to produce the bends, as seen in Fig. 2, and so as to bring the two eyes together, and so that each successive blank passed through the two eyes of the preceding link, the bend, at $b$, forms one end of the link, while the eyes form the opposite end, and so as to make a succession of connected links to form the chain.

The method of manufacture which my invention follows, consists in first cutting the blank for the chain, as in Fig. 1, then doubling the link into U-shape, as seen in Fig. 3, then passing successive bent links through the eyes of the links which have been previously bent into U-shape, and as seen in Fig. 4, $c$, representing the previously bent link, and $d$, the next bent link as passing through the eyes of the previously bent link, then turning the link so introduced into line with the previously formed links and closing the eyes of the next preceding link together, as seen in Fig. 5, the last introduced link being in a position to receive the next U-shaped bent link.

The object of my invention is to automatically produce this chain, employing the method described, and so that a strip of metal fed into the machine, the blanks may be punched therefrom, bent into U-shape, advanced, succeeding U-shaped bent links threaded through the preceding bent link, and the chain delivered complete from the machine, and the invention consists in the combination of instrumentalities for automatically producing this chain as hereinafter described, and particularly recited in the claims.

In illustrating the invention, I show it as applied to a common power-press. This press consists of a vertical reciprocating slide A, arranged between two guides B, B, and to which a vertical reciprocating movement is imparted from the driving-shaft C, through power applied thereto by means of a pulley D, or otherwise, and as usual in power-presses. At the rear of the press a pair of feed-rolls E, F, are arranged, in a plane with the top of the bed G, of the machine, see Fig. 10, the rolls rotating intermittently, and so that a strip of metal H, placed between the rolls, will be advanced step by step into the machine, over the bed G. The intermittent rotation of the feed-rolls is produced, as here represented, by means of a cam I, on the driving-shaft C, see Fig. 7, through a lever J, in connection by a rod K, with a bell-crank lever L, on the arbor M of the roll F. One arm of the bell-crank lever L, carries a pawl N, which operates upon a ratchet O, made fast to the arbor M, of the roll F, and so that vibration imparted to the lever J, by the cam I, will produce an advance rotation of the feed-rolls, a suitable spring P, being provided to return the levers and pawl after an advance shall have been made. The slide A, carries two punches R, which correspond to holes S S, in the bed, see Fig. 9, these holes and punches corresponding to the shape required for the eyes in the two ends of the blank, and so that as the slide descends, the punches will accordingly punch from the strip H. After the eyes have been thus punched, the strip is advanced, so that the eye punched portion will be presented over an opening T, in the bed, which corresponds in shape to the outline of the link, and above this opening the slide carries a correspondingly shaped punch U, and which as the slide A, descends, will punch the blank from the strip. In order to advance this blank for the next operation, and in doing so to employ the feed-rolls as the means for such advance, the blank cut from the strip by the punch U, is returned, or forced back into the opening in the strip from which it was cut, before the next advance of the strip. The return of the blank into the strip is produced by a spring-follower V, see Figs. 11 and 12; this follower is arranged directly below the opening through which the blank is punched, and normally stands flush with the surface in which the opening is formed, as seen in Figs. 10 and 12, but as the punch U, descends, it strikes the strip upon its upper surface, and punches the blank through into the opening below, and so as to depress the follower V, as seen in Fig. 11, W, representing the blank which has been cut from the strip. Then as the punch U, rises, the follower under the action of its spring returns the blank into the opening in the strip from which it was cut, as seen in Fig. 12, and so that as the strip is next advanced, the blank thus cut therefrom will be advanced with the strip.

The next operation is to bend the blank into U-shape. Forward of the blank-cutting punch and die, a table e, is arranged in a horizontal plane, and so as to rotate upon a vertical axis f, see Fig. 10; the upper surface of this table is in the same plane as the surface of the bed, or dies, by which the blank is formed. The table e, is constructed on its surface with a series of recesses or cavities g, each of which is adapted to receive one of the link blanks, as seen in Fig. 15, the depth of these recesses being somewhat greater than the thickness of the blanks, as seen in Figs. 13 and 14, and at each step of the rotation of the table e, one of these recesses g, of the table is brought into line with the strip and with the blank which has been advanced therein, as seen in Fig. 9, and through the table e, in the center of each of the cavities g, is an opening h, transversely across the cavity, the width of the opening corresponding to the width of the U-shaped bend required for the link. On the slide A, above the opening h, which is presented below the strip, is a punch i, which, as the slide descends, will force the blank from the strip into the cavity g, see Fig. 13, and so as to bring the blank W, into that cavity centrally over the opening h in the bed as seen in Fig. 13. An intermittent rotation is imparted to the table e, so that after it has received one blank, the next cavity may be presented to receive the next blank, and so on. As here represented, the intermittent rotation is imparted to the table e, by means of a cam j, on a transverse shaft k, arranged in bearings l, on the bed of the machine, the shaft k, being in connection with the driving-shaft C, through a counter-shaft m, and bevel-gears n, as shown, so that the revolution of the two shafts are the same. The cam j, imparts intermittent reciprocating movement to a slide o, which carries a pawl p, arranged to work into a ratchet r, on the table, and so that at each operation of the slide of the press, one step advance movement will be imparted to the table. The step in advance thus produced by the table, brings the blank W, beneath the bending punch s, which is also operated by the slide A; this punch forces the blank down into the opening h, of the table, as seen in Fig. 14, doubling the blank at the center, and bending it into U-shape; then as the slide rises, the punch s, is withdrawn, leaving the blank in the table. In the next advance of the table, the U-shaped bent link is brought over a vertical reciprocating punch 2, see Fig. 10, the punch being operated by means of a cam 3, on the counter-shaft k, through a lever 4, and so that at the proper time, the punch 2 will rise, as seen in Fig. 16, up into the opening h, in the table, and striking the bend of the link, will force it upward, and away from the table, as represented in broken lines Fig. 16. The punch 2 then descends, and permits the rotation of the table to present the next U-shaped bent link for a like discharge from the table.

Before commencing the operation of the machine, it is necessary to introduce into the machine links already bent, as represented in Fig. 16, the plane of the bent links being transverse to the path of the upward movement of the bent links as they are forced from the table, and as seen in Figs. 16, 5, 6, 7, and 8 representing such previously bent links. These previously bent and prepared links are passed through a horizontal opening 9, in a block 10, arranged on the bed of the machine, and in a plane above the table, as seen in Figs. 10 and 16. On the face of the block 10, a pair of jaws 11 and 12 are arranged to slide in paths at right angles to the line of the formed chain; these jaws are pressed inward by springs 13 at their outer ends, so that they are yieldingly held in the closed position, as seen in Fig. 15; they stand upon opposite sides of the opening 9, through which the chain passes, and so as to grasp a bent link back of the eye, as seen in Fig. 15, and so as to support the link, but because of their springs, they are adapted to yield under a force tending to separate them. The link thus held by the jaws 11 and 12, stands over the opening in the table, so that one leg of the bent link in the said opening will stand directly below the eye of that link held by the jaws, as seen in Fig. 15. As soon as one link is forced from the table, up and through the eyes of that link held by the jaws, as seen in broken lines Fig. 16, a forced advance of the previously bent links is made. This advance of the previously bent links brings the rounded portion, or increasing width of the link in the jaws, to bear upon the face of the jaws, and so as to cause them to open, as represented in broken lines Fig. 15. This pull upon the previously connected links will draw the last introduced link forward between the jaws, and bring it into the same plane as the previously bent links, and so that that link will take the place of the link 5, Fig. 15, ready to receive the next link as it is presented by the table, and so continuing, successive links will be introduced to the previously formed link and advanced. To thus advance the chain as it is formed link by link, a disk 14, is arranged in a horizontal plane, and to which an intermittent rotation is imparted by means of a cam 15 on the shaft $k$, which imparts reciprocating movement to a slide 16, the said slide carrying a pawl 17, adapted to work into the teeth of a ratchet 18, on the disk 14. In the periphery of the disk 14, a series of projecting pins or teeth 19, are arranged, distant from each other corresponding to the length of the links, the path of the said pins being in line with the formed chain as it passes from the block 10, as seen in Fig. 15; these pins engage successive links of the chain like a sprocket-wheel, and so that as the wheel 14, rotates, it will impart a corresponding advance movement to the chain. The intermittent rotation imparted to the wheel 14, corresponds to the step by step advance required for the chain as successive links are introduced.

It is desirable that the eye ends of the links shall be closed together, as represented in Figs. 2 and 5, as it gives to the chain a neater and more finished appearance than it would present were the links not so closed, that is, if they were left like the links 5, 6, and 7 in Fig. 16. To produce this closing, a pair of jaws 20, 21, are arranged in the path of the advancing chain, one jaw being above and the other below the links; these jaws are hung upon an axis 22. Their tails, respectively 23, and 24 extend outward, and are operated upon by a cam 25, which stands between them, see Fig. 17, and so that the cam will force the tails asunder and bring the jaws together, as represented in Fig. 17, or permit the jaws to open as represented in broken lines same figure. These jaws are arranged as seen in Fig. 9, so as to operate upon the link which stands engaged with one of the pins of the feed-wheel 14, and the time of operation of the jaws is such that while the feed-wheel 14, is stationary, the jaws will come together upon the flat sides of the eye portions of the link, and close the eye portions together, as represented in Fig. 16, thus completing the link, and the jaws operate in like manner upon each successive link as it is presented, the links passing between the jaws as the chain is fed from the machine. At some convenient point the chain is drawn from the pins of the wheel 14, and so as to pass from the machine complete. As here represented this discharge is produced by a guard 26, arranged in the path of the chain, so as to strip it from the pins as the feed-roll rotates.

By a machine thus constructed, I am enabled to produce the class of chain to which the machine is adapted, automatically, from the strip of sheet-metal, and deliver it complete from the machine.

In some cases it may be desirable to punch the blanks complete from the strip in a press independent of the link-bending and uniting, in such case the punches R, U, and I, with the dies corresponding to the punches R and U, may be omitted, the blanks being successively fed to the cavities $g$, in the table or carrier, by hand, or otherwise. It will also be understood that the closing jaws 20, 21, may be omitted should it not be required to close the links as described.

I claim—

1. In a machine for making flat-metal chain substantially such as described, the combination of a rotating carrier constructed with cavities in its surface corresponding to the link blanks, and with openings through the carrier centrally from said cavities, a punch arranged to double the blanks and force them into said openings to bring them into U-shape, a second reciprocating punch arranged to force the said double blanks from the said openings, but in the opposite direction to that from which the blanks entered, a holder arranged to support the previously bent link over the last mentioned punch, but in a plane at right angles to the plane of the blank in the carrier, and whereby as the blanks are forced from the carrier, one leg of the U-shaped blank will pass through the eyes of the said previously bent link, and a feeding device substantially such as described to advance the chain as successive links are introduced, substantially as described.

2. In a machine for making chain substantially such as described, the combination of the intermittently rotating table or carrier e, constructed with a series of openings h, through it, a reciprocating bending punch S, arranged to work into said openings as they are successively presented, and to double the blanks arranged over the said openings and bring them into U-shape therein, a second reciprocating punch 2, arranged to work through the said openings in the table, but in the opposite direction to the punch s, a stationary head 10, having an opening 9, through it, through which the chain may pass, a pair of spring jaws 11 and 12, arranged on the said head, and so as to work in paths transverse to the line of the chain being produced, with a feed adapted to intermittently advance the chain as successive links are introduced, substantially as described.

3. In a machine for making flat metal chain substantially such as described, the combination of the intermittently rotating table or carrier e, the table constructed with openings h, through it, and over which openings the blanks are presented, a reciprocating punch s, arranged to double the said blanks into the said openings, and a reciprocating punch 2, also arranged to work through said opening h, but in opposite direction to the punch s, a pair of jaws 11 and 12, arranged to work in planes at right angles to the chain as it passes from the machine, the said jaws being adapted to grasp the last bent link preparatory to receiving the next bent link, an intermittently rotating wheel 14, having a series of pins upon its edge corresponding to successive links of the chain, substantially as described.

4. In a machine for making flat metal chain substantially such as described, the combination of the table or carrier e, constructed with a series of openings h, a reciprocating punch s, adapted to double the blanks into the said openings in the carrier, a second reciprocating punch 2, adapted to work through the said openings h, but in opposite direction to the punch s, a holder through which the chain passes, said holder being adapted to support the last bent link preparatory to receiving the next bent link, a feed arranged to advance the chain as the links are successively applied thereto, and a pair of jaws 20 and 21, arranged to close upon the successive links substantially as and for the purpose described.

5. In a machine for making flat metal chain substantially such as described, the combination of the reciprocating eye and blank punches R U, their corresponding dies, and between which punches and dies the strip of metal passes from which the blanks are to be cut, the follower W, arranged below the blank-punch U, an intermittently rotating carrier, the face of which is in substantially the plane of the surface of the dies over which the strip passes, the said carrier constructed with a series of cavities g, each corresponding to a flat blank, and the carrier constructed with an opening h, centrally through the said cavities, the reciprocating punches i, s and 2, with a feed substantially such as described, and substantially as and for the purpose described.

6. In a machine for making flat metal chain substantially such as described, the combination of the punches R and U with corresponding dies S and T, a spring follower V, the die T, opposed to the punch U, the intermittently rotating table e, constructed with a series of cavities g, and central openings h, in said cavities through the table, the reciprocating punches s and 2, with the jaws 11 and 12, and a feeding mechanism, substantially as described.

7. In a machine for making flat metal chain such as described, the combination of strip feeding mechanism, mechanism for cutting the blank from the strip, punching the eyes therein, and doubling the blank into U-shape, appliances for passing the U-shape blank through the eyes of a previously bent link, with feeding mechanism to advance the chain as it is formed, substantially as set forth.

8. In a machine for making flat metal chain such as described, the combination of mechanism to double the blank into U-shape, appliances for transferring the U-shaped link and passing it through the eyes of a previously bent link, with feeding mechanism to intermittently advance the chain as it is formed, substantially as set forth.

9. In a machine for making flat metal chain such as described, the combination of the following instrumentalities: mechanism adapted to double the blank into U-shape; appliances to transfer the said U-shaped blank and pass it through the eyes of a previously bent link; feeding mechanism to advance the chain as the successive links are introduced, and mechanism to close the eye ends of the U-shaped links, substantially as described.

In testimony whereof I have signed this specification in the presence of two subscribing witnesses.

RALPH WM. JORRES.

Witnesses:
WM. J. SCHLEGEL,
BERNICE M. ANDREWS.